United States Patent
Wang et al.

(10) Patent No.: US 11,876,552 B2
(45) Date of Patent: Jan. 16, 2024

(54) METHOD FOR MITIGATING PASSIVE INTERMODULATION AND AN APPARATUS THEREFOR

(71) Applicant: Telefonaktiebolaget LM Ericsson (publ), Stockholm (SE)

(72) Inventors: Fanggang Wang, Beijing (CN); Haiying Cao, Beijing (CN); Yu Liu, Beijing (CN); Peng Liu, Beijing (CN); Vijay Venkateswaran, Västerås (SE); Bo Ai, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/794,232

(22) PCT Filed: Feb. 4, 2020

(86) PCT No.: PCT/CN2020/074267
§ 371 (c)(1),
(2) Date: Jul. 20, 2022

(87) PCT Pub. No.: WO2021/155493
PCT Pub. Date: Aug. 12, 2021

(65) Prior Publication Data
US 2023/0071619 A1 Mar. 9, 2023

(51) Int. Cl.
*H04B 1/525* (2015.01)
*H04L 1/00* (2006.01)

(52) U.S. Cl.
CPC ........... *H04B 1/525* (2013.01); *H04L 1/0054* (2013.01); *H04L 1/0061* (2013.01)

(58) Field of Classification Search
CPC ...... H04B 1/525; H04L 1/0054; H04L 1/0061
See application file for complete search history.

(56) References Cited

U.S. PATENT DOCUMENTS

| 10,727,896 B2 | 7/2020 | Lv et al. |
| 2004/0048576 A1 | 3/2004 | Hildebrand et al. |

(Continued)

FOREIGN PATENT DOCUMENTS

| CN | 105991157 A | 10/2016 |
| CN | 109845118 A | 6/2019 |

(Continued)

OTHER PUBLICATIONS

International Search Report and the Written Opinion of the International Searching Authority, issued in corresponding International Application No. PCT/CN2020/074267, dated Nov. 6, 2020, 7 pages.

(Continued)

*Primary Examiner* — Vineeta S Panwalkar
(74) *Attorney, Agent, or Firm* — Rothwell, Figg, Ernst & Manbeck, P.C.

(57) ABSTRACT

There is provided mechanisms for mitigating passive intermodulation in a first network node, wherein said PIM is caused by radio signals transmitted from at least an adjacent network node. The method is performed by a control device. The method comprises receiving at least an uplink radio signal and down-converting the received UL radio signal to a UL baseband signal. The method applies a cyclic redundancy check, CRC, to detected information bits of the received UL baseband signal, wherein in response to determining by the CRC that the UL baseband signal is detected correctly, directly output the detected information bits. The method comprises in response to determining by the CRC that the UL baseband signal is incorrectly detected, determining a residual signal of the received UL baseband signal applying a blind signal identification scheme on the residual signal of the UL baseband signal to obtain an estimate for a modeled PIM signal. The method comprises subtracting the estimated modelled PIM signal from the received UL base- (Continued)

band signal as in the first step and updating the received UL baseband signal in an iterative process until CRC is detected correctly or until number of iterations exceeds a predetermined threshold.

20 Claims, 6 Drawing Sheets

(56) References Cited

U.S. PATENT DOCUMENTS

| 2012/0295558 | A1 | 11/2012 | Wang et al. |
| 2017/0201277 | A1 | 7/2017 | Wang et al. |
| 2018/0359048 | A1* | 12/2018 | Stephenne ............ H04L 1/0009 |

FOREIGN PATENT DOCUMENTS

| EP | 3176951 A1 | 6/2017 |
| EP | 3129797 B1 | 7/2018 |
| GB | 2508443 A | 6/2014 |
| NO | 2018076373 A1 | 5/2018 |
| WO | 2017080345 A1 | 5/2017 |
| WO | 2017147759 A1 | 9/2017 |

OTHER PUBLICATIONS

3GPP, "3rd Generation Partnership Project; Technical Specification Group Radio Access Network; Passive Intermodulation (PIM) handling for Base Stations (BS) (Release 12)", 3GPP TR 37.808 V12.0.0 (Sep. 2013), 27 pages.
Dabag et al. "All-Digital Cancellation Technique To Mitigate Self-Jamming In Uplink Carrier Aggregation In Cellular Handsets" IEEE, 2013, 3 pages.
Dabag et al. "All-Digital Cancellation Technique to Mitigate Receiver Desensitization in Uplink Carrier Aggregation in Cellular Handsets" IEEE Transactions On Microwave Theory and Techniques, vol. 61, No. 12, Dec. 2013, pp. 4754-4765.
Waheed et al. "Digital Self-interference Cancellation in Inter-band Carrier Aggregation Transceivers: Algorithm and Digital Implementation Perspectives" IEEE, 2017, 5 pages.
Kahrizi et al. "Adaptive Filtering Using LMS for Digital TX IM2 Cancellation in WCDMA Receiver" IEEE, 2008, pp. 519-522.
Omer et al. "A PA-Noise Cancellation Technique for Next Generation Highly Integrated RF Front-Ends" 2012 IEEE Radio Frequency Integrated Circuits Symposium, pp. 471-474.
Waheed et al. "Digital Cancellation of Passive Intermodulation in FDD Transceivers" arXiv:1812.03655v1 [eess.SP] Dec. 10, 2018, 7 pages.
Venkateswaran "Blind passive intermodulation suppression in uplink" Ericsson, Sep. 11, 2017, 14 pages.
Zhang et al. "Cooperative Modulation Classification for Multipath Fading Channels via Expectation-Maximization" IEEE Transactions On Wireless Communications, vol. 16, No. 10, Oct. 2017, pp. 6698-6711.
Liu et al. "Blind Identification of LDPC Codes in Multipath Fading Channel via Expectation Maximization" IEEE, 2018, 6 pages.
Bkassiny et al. "Blind Cyclostationary Feature Detection Based Spectrum Sensing for Autonomous Self-Learning Cognitive Radios" IEEE ICC 2012—Cognitive Radio and Networks Symposium, pp. 1507-1511.
Nasir et al. "Blind Fractionally Spaced Equalization and Timing Synchronization in Wireless Fading Channels" IEEE, 2010 2nd International Conference on Future Computer and Communication, pp. V3-15-V3-19.

* cited by examiner

METHOD FOR MITIGATING PASSIVE INTERMODULATION AND AN APPARATUS THEREFOR

CROSS REFERENCE TO RELATED APPLICATION(S)

This application is a 35 U.S.C. § 371 National Phase Entry Application from PCT/CN2020/074267, filed Feb. 4, 2020, designating the United States, the disclosure of which is incorporated herein by reference in its entirety.

TECHNICAL FIELD

The proposed technology presented herein relates to a method, a control device, a computer program, and a computer program product for mitigating passive intermodulation in a network node.

BACKGROUND

Interference is an annoying issue in most networks, since it disrupts or modifies a signal. In the presence of non-linear behavior, received uplink (UL) signals can be contaminated with interference resulting from the interaction of other base stations or networks.

Passive intermodulation (PIM) is a kind of interference or distortion that occurs in passive components such as antennas, cables, connectors, or duplexers with two or more high-power input signals. This disturbance occurs especially in the base station, where several networks systems must share the same infrastructure and a few transmitted signals are physically close to each other, and they can even share the same transmitting or receiving antenna. It is highly possible that several transmitted signals hit the same non-linear junction (sources) and generate PIM distortion which falls in the receiver bands of the base station. Moreover, the PIM distortion can also appear due to the interference from other operators or malicious users, which is difficult to cancel in the practical communication systems. Due to the non-linear behavior of the PIM sources such as switches and duplexers, PIM that appear in the working band can lead to severe degradation of receiver sensitivity. Algorithms for PIM cancellation has been known, which aims to cancel PIM caused by uplink carrier aggregation (CA). To maintain the same receiver sensitivity and to improve data detection performance, an all-digital cancellation algorithm was designed, which relies on the digital representation of the signals, a peak covariance search for time alignment, and a recursive least squares (RLS) adaptive filter. To mitigate PIM, some previous solutions uses an all-digital cancellation algorithm, which cancel the cross-modulation products created by the nonlinearity of antenna switches and duplexers in the radio frequency (RF) front end. RLS was used to find the optimal coefficients for the adaptive filter. The problem of self-interference in transceivers performing inter-band CA has also been studied, where separate power amplifiers (PAs) were used for each component carrier (CC). A behavioral model considering both the nonlinearity of the PAs and the passive components was derived. Then, the PIM could be canceled by subtracting it from the received signal. The adoption of Carrier aggregation (CA) has been used in the existing Long-Term Evolution (LTE)-Advanced and emerging 5G New Radio (NR) mobile networks, but with the use frequency division duplexing (FDD) it may incur self-interference challenges with certain bands. A PIM cancellation method was developed that cancelled the self-interference resulting from the nonlinear passive components in CA-based radio transceivers. A baseband equivalent modelling of PIM is also known, which considered memory effects of Power amplifiers. Then, based on the model, PIM could be cancelled in the transceiver digital front-end. Thus, in these prior art solutions, it is known how to solve the PIM cancellation problem when there is information of the downlink (DL) transmitted signal. However, when the DL transmitted signal is unknown or when there is no access to the DL signal, the PIM cannot be modeled by the current approaches in literature. Thus, for such problems a solution is needed for an improved method to be able to efficiently estimate PIM.

SUMMARY

It is an object to provide procedures to handle passive intermodulation in a resource-efficient manner. This and other objects are met by embodiments of the proposed technology. There are, proposed herein, various embodiments which address one or more of the issues disclosed herein.

According to a first aspect, there is provided a method mitigating passive intermodulation in a first network node, wherein said PIM is caused by radio signals transmitted from at least an adjacent network node. The method is performed by a control device. The method comprises the following steps:
i) receiving at least an UL radio signal comprising disturbance and desired signals and down-converting the received UL radio signal to a UL baseband signal; wherein the received UL baseband signal comprises detected information bits
ii) applying a cyclic redundancy check, CRC, to the detected information bits of the received UL baseband signal, wherein in response to determining by the CRC that the UL baseband signal is detected correctly directly output the detected information bits, and, in response to determining by the CRC that the UL baseband signal is incorrectly detected, determining a residual signal of the received UL baseband signal;
iii) applying a blind signal identification scheme on the residual signal of the UL baseband signal to obtain an estimate for a modeled PIM signal; and
iv) subtracting the estimated modelled PIM signal from the received UL baseband signal as in step i) and updating the received UL baseband signal in an iterative process until CRC is detected correctly or until number of iterations exceeds a predetermined threshold.

According to a second aspect, there is provided a control device for mitigating passive intermodulation in a first network node, wherein said PIM is caused by radio signals transmitted from at least an adjacent network node. The control device is configured to:
i) receive at least an UL radio signal comprising disturbance and desired signals and down-converting the received UL radio signal to a UL baseband signal, wherein the received UL baseband signal comprises detected information bits;
ii) apply a cyclic redundancy check, CRC, to the detected information bits of the received UL baseband signal, wherein
in response to determining by the CRC that the UL baseband signal is detected correctly, directly output the detected information bits, and, in response to determining by the CRC that the UL baseband signal is incorrectly detected, determining a residual signal of the received UL baseband signal;

iii) apply a blind signal identification scheme on the residual signal of the UL baseband signal to obtain an estimate for a modeled PIM signal; and iv) subtract the estimated modelled PIM signal from the received UL baseband signal as in step i) and updating the received UL baseband signal in an iterative process until CRC is detected correctly or until number of iterations exceeds a predetermined threshold.

According to a third aspect, there is provided a control device for mitigating passive intermodulation in a first network node, wherein said PIM is caused by radio signals transmitted from at least an adjacent network node. The control device comprises processing circuitry. The processing circuitry is configured to cause the control device to:

i) receive at least an UL radio signal comprising disturbance and desired signals and down-converting the received UL radio signal to a UL baseband signal, wherein the received UL baseband signal comprises detected information bits;

ii) apply a cyclic redundancy check, CRC, to the detected information bits of the received UL baseband signal, wherein in response to determining by the CRC that the UL baseband signal is detected correctly, directly output the detected information bits, and, in response to determining by the CRC that the UL baseband signal is incorrectly detected, determining a residual signal of the received UL baseband signal;

iii) apply a blind signal identification scheme on the residual signal of the UL baseband signal to obtain an estimate for a modeled PIM signal; and iv) subtract the estimated modelled PIM signal from the received UL baseband signal as in step i) and updating the received UL baseband signal in an iterative process until CRC is detected correctly or until number of iterations exceeds a predetermined threshold.

According to a fourth aspect, there is provided a computer program product comprising a non-transitory computer readable medium storing instructions which when executed by a computer, cause the computer to perform the method according to the first aspect.

According to a fifth aspect there is presented a computer comprising instructions which, when executed by a computer, cause the computer to perform the method according to the first aspect. The computer readable storage medium could be a non-transitory computer readable storage medium.

According to a sixth aspect there is presented a a non-transitory computer-readable storage medium storing instruction which, when executed by a computer, cause the computer to perform the method according to the first aspect.

Advantageously the proposed technology offers the possibility to provide an efficient method to detect and cancel the PIM distortion blindly. The novel blind identification scheme is designed to estimate the unknown parameters, i.e., the carrier frequency, identify the modulation format, channel coding, detect the information bits, and so forth from the DL signals resulting PIM. The estimated parameters, the identified patterns, and the detected information bits are used to reconstruct the PIM, which will be efficiently canceled at the receiver of a base station.

Other objectives features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Throughout the drawings, the same reference designations are used for similar or corresponding elements. Any step or feature illustrated by dashed lines should be regarded as optional.

Figure 1A:
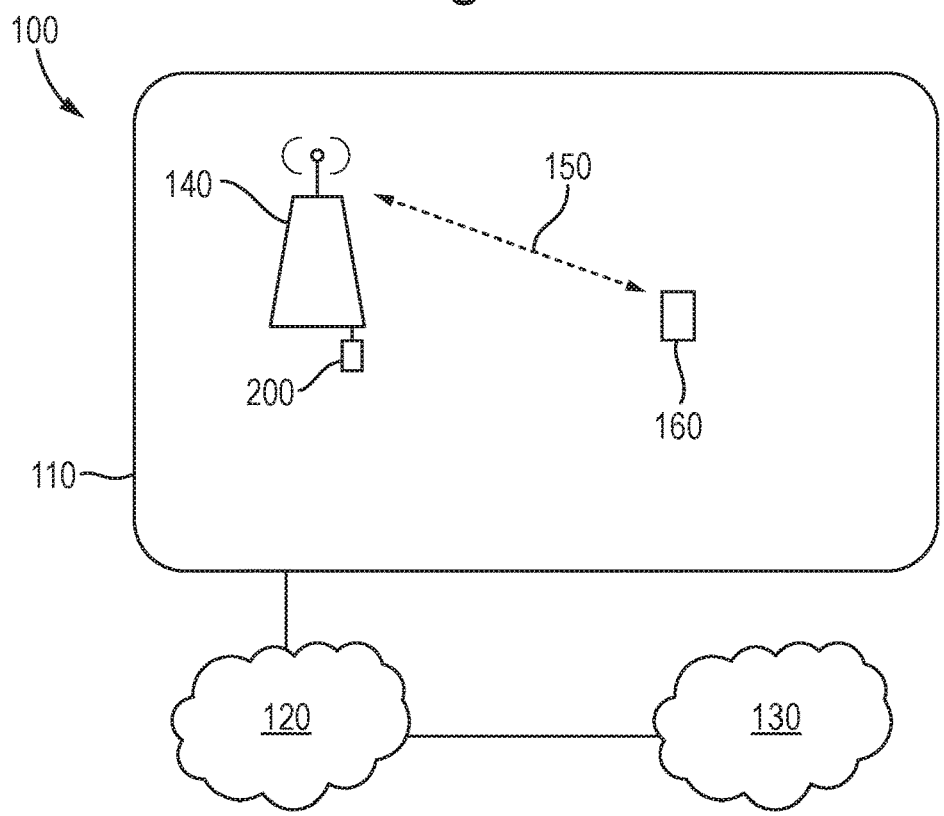
FIG. 1a is a schematic diagram illustrating a communications network according to embodiments.

FIG. 1a is a diagram that illustrates a communications network 100 where embodiments presented herein can be applied. The communications network 100 could be a third generation (3G) telecommunication system, a fourth generation (4G) telecommunication system or sometimes also called Long Term Evolution (LTE), or a fifth (5G) telecommunication system or also called New Radio (NR) and support any 3GPP telecommunications standard, where applicable.

The communications network 100 comprises a control node 200 (control device) configured to control a radio base station 140 that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the network node, access services of, and exchange data with, the service network 130.

Some examples of radio base stations 140 are radio access network nodes, radio base stations, base transceiver stations, Node Bs, evolved Node Bs (e Node Bs), g Node Bs, access points, access nodes, transmission and reception points, and backhaul nodes. Some examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control node 200 might comprise, be collocated with, integrated with, or be in operational communications with, the radio base stations 140. The control node may herein also be called a control device. The base stations may herein also be called network nodes.

Figure 1B:
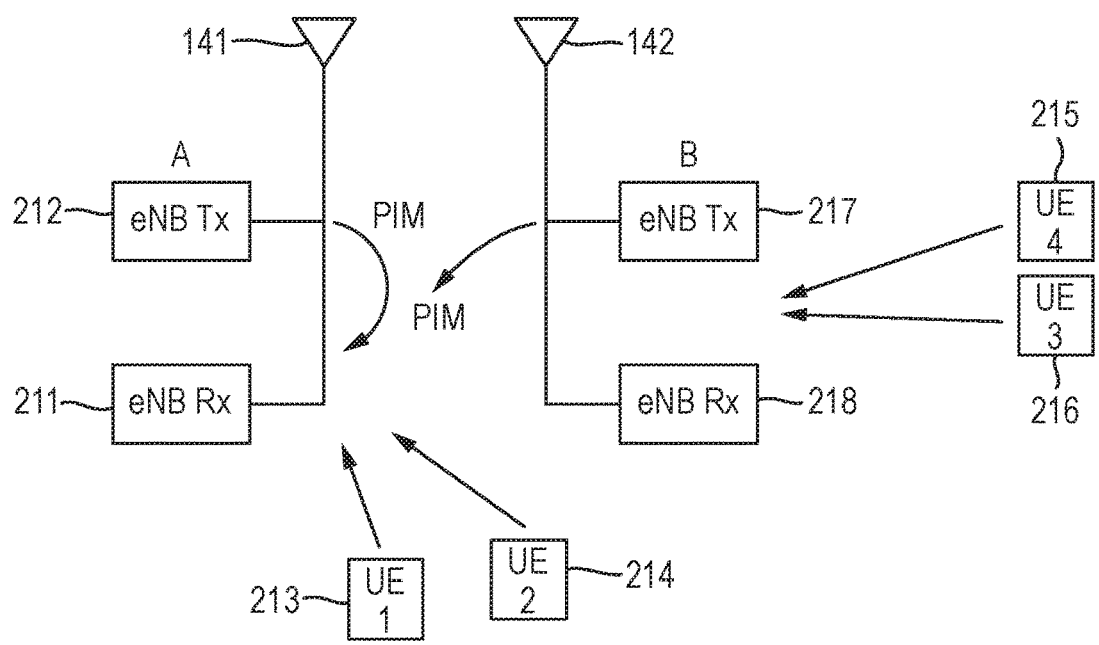
FIG. 1b is schematically illustrating an interference scenario according to an embodiment.

With reference to an embodiment shown in FIG. 1b, an example of an uplink (UL) communication setup is illustrated, where two network nodes 141,142 are receiving signals from a set of UEs 213, 214 and 215, 216 and passive intermodulation (PIM), from a combination of transmit signals from adjacent network nodes or both from the same network node combined with signals from a signal from adjacent network nodes. This is just an example of two network nodes but may work in a similar way with several network nodes. In FIG. 1b, a transmit unit 212 and a receive unit 211 is located in the same network node and another transmit unit 217 and receive unit 218 is located in an adjacent network node. In some cases, PIM may be caused by some leaking from more units. Thus, as may be seen in FIG. 1b, PIM is leaking in the DL from the transmit unit 212 to the receive unit 211. Also, PIM is leaking or disturbing from transmit unit 217 to receive unit 211 and to receive unit 218. Alternatively, PIM may only be disturbing from the transmit unit 217 of adjacent network node or from several adjacent network nodes. This is disturbing the communication in the UL of the first network node.

The embodiments disclosed herein employ a solution to mitigate passive intermodulation when the downlink is unknown.

At least some of the embodiments disclosed herein relate to mechanisms for ensuring that PIM can be mitigated. The embodiments disclosed herein in particular relate to mechanisms based on applying a CRC and a blind signal identification scheme in an iterative process until CRC is detected or the number of iterations exceed a predetermined threshold.

In order to obtain such mechanisms, there is provided a control device 200 for mitigating the PIM, a method performed by the control device 200, a computer program product comprising code, for example in the form of a computer program, that when run on a control device 200, causes the control device 200 to perform the method.

Figure 2:
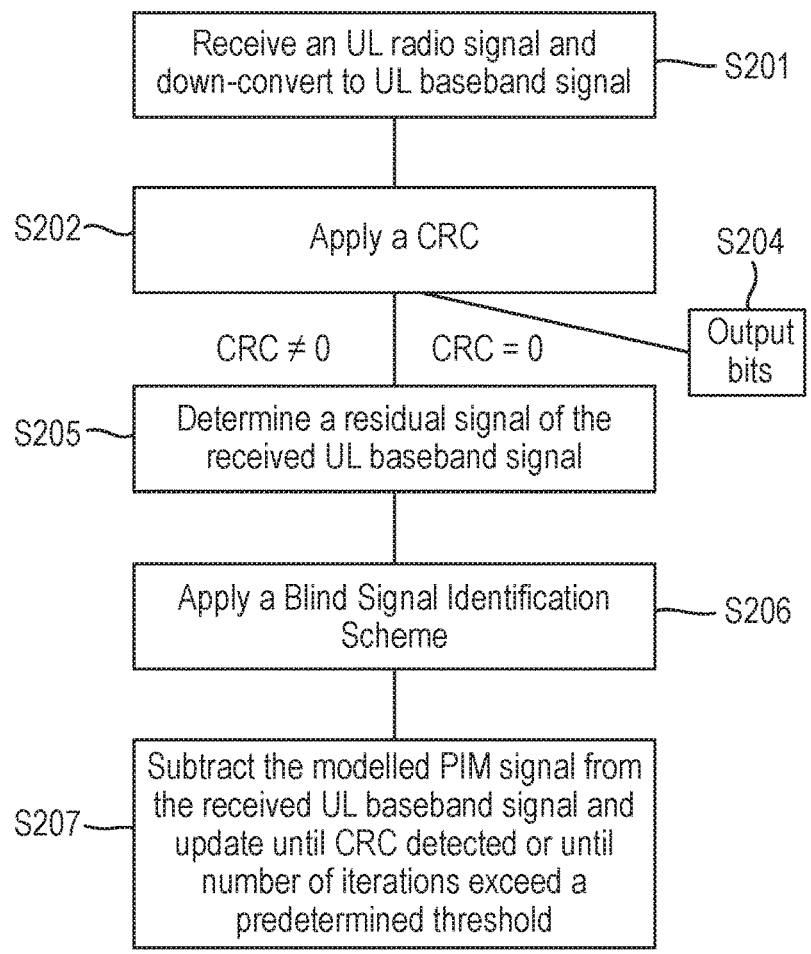
FIG. 2 is a flow chart of methods according to embodiments.
Figure 3:
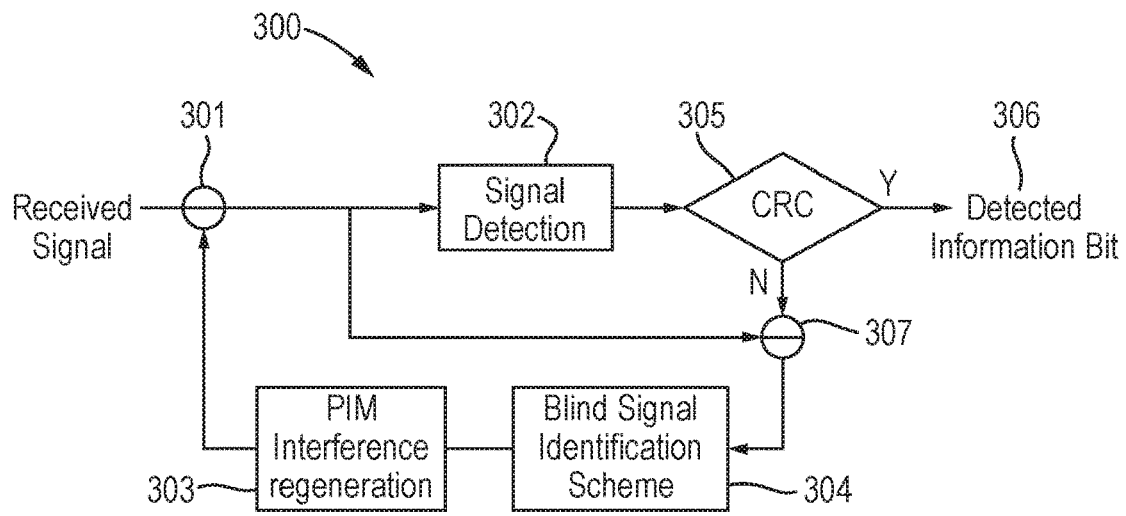
FIG. 3 is a block diagram illustrating implementation of the PIM mitigation according to embodiments.

FIG. 2 is a flowchart illustrating preferred embodiments of methods for mitigating PIM in a first network node. The PIM is caused by radio signals transmitted from at least an adjacent network node. The methods are performed by a control device 200. The methods are advantageously provided as computer programs 1120.

The flowchart describes the steps performed by the control device.

S201: The control device receives or obtains at least an UL radio signal comprising disturbance and desired signals and down-converts the received UL radio signal to a UL baseband signal. The received UL baseband signal comprises detected information bits. The word "detected" may herein mean that we use the received signal to determine the transmitted information bits at the baseband.

S202: The control device 200 applies a cyclic redundancy check, CRC, to the detected information bits of the received UL baseband signal. In this step, it determines whether the information bits are detected correctly or incorrectly. The received UL baseband signal may be synchronized with radio signals of the first network node before applying the CRC.

The following steps continues in two different ways depending on whether the bits are detected correctly or incorrectly.

S204: In response to determining by the CRC that the UL baseband signal is detected correctly, the control device directly output the detected information bits (S204). It is correctly detected when CRC=0. In other words, if the CRC determines that the UL baseband is correctly detected, it directly outputs the detected information bits and the process is finished. Herein the term "baseband" means the frequency baseband.

S205: In response to determining by the CRC that the UL baseband signal is incorrectly detected, the control device determines a residual signal of the received UL baseband signal (S205). It is incorrectly detected when CRC #0. In other words, if the CRC determines that the UL baseband is incorrectly detected it determines a residual signal of the received UL baseband signal. The determination of the residual signal of the received UL baseband signal may comprise transforming the incorrectly detected information bits of the received UL baseband signal to symbols and subtracting the symbols from the received UL baseband signal.

S206: The control device applies a blind signal identification scheme on the residual signal of the UL baseband signal to obtain an estimate for a modeled PIM signal.

S207: The control device subtracts the estimated modelled PIM signal from the received UL baseband signal as in step S201 and updates the received UL baseband signal in an iterative process until CRC is detected correctly or until number of iterations exceeds a predetermined threshold.

According to an aspect, the blind identification scheme may comprise a maximum likelihood estimation (MLE) of the residual signal. However, it may alternatively be a maximum a posteriori probability (MAP) estimation or machine learning algorithms of the residual signal.

In some aspects, the MLE may comprise estimating parameters, patterns and intermodulation products of the PIM from the residual signal of the baseband UL signal to obtain the estimate of the PIM modelled signal. The parameters and patterns of the PIM may comprise at least one of: carrier frequency, modulation format, coding patterns, control channel parameters and information bits of the disturbance. It may also comprise a propagation delay.

In some aspects the PIM may be caused by known DL radio signals from the first network node and unknown DL radio signals from the least the one adjacent network node. Alternatively, it may be that PIM is being only caused from unknown DL radio signals of the adjacent network node.

The word "adjacent" is herein meaning network nodes that are physically. This may also be called a rough separation of the PIM interference signal $\hat{v}^{(t)}$. The residual signal may herein in a non-limiting example comprise of PIM interference, noise and other interferences. Then the detected information bits are encoded and modulated to the modulated symbols, and represent the PIM signal as $\hat{v}^{(t)}$ $$\hat{v}^{(t)} = x_c^{(t)} - \{\hat{i}_c^{(t)}\} = s_{PIM}^{(t)} + \omega \quad (4)$$

where $M_c$ denotes the encoding and modulating process of the uplink signal $x_c^{(t)}$.

In the third step, to determine the unknown DL signals that cause PIM and lead to the additional performance degradation and to cancel the PIM signal $s_{PIM}^{(t)}$ from the received baseband signal $x_c$, a blind signal identification module 304 is first designed. It is noted that the PIM distortion $s_{PIM}^{(t)}$ in formula (2) is produced by the known DL communication signal $s_a$ from base-station A and the unknown interference signal $s_b$ from base-station B. Thus, there is a need to estimate the carrier frequency, the unknown DL channel $h_b$, and the propagation delay $\tau$, identify the modulation and coding pattern, determine the transmitted symbols of the unknown $s_b$. Then the unknown signal $s_b$ and the PIM distortion $s_{PIM}^{(t)}$ in formula (2) can be determined. This is repeated for different DL signal combinations. Actually, it is not possible to determine the parameters, the modulation and coding pattern, and the information bits of $s_b$ directly. However, the base-station can still determine the patterns which $s_b$ may use. In other words, the base-station knows the candidates set of the interference signal $\theta=1, 2, \ldots, P$. Then, based on the hypothesis testing theory, the likelihood estimates $L_\theta$ are calculated for the P candidates. Thus, a blind signal identification module 304 is designed that may be configured to classify the modulation format of $s_b$, and determine the transmitted information bits. The likelihood estimates $L_\theta$ in the iteration t is written as $$L_\theta^{(t)} = \ln \sum_{\hat{s}_{PIM}^{(t)}} p_c(\hat{v}^{(t)} | s_{PIM}^{(t)}) p_c(s_{PIM}^{(t)}) = \quad (5)$$

$$\sum_{n=1}^{N} \ln \sum_{m=1}^{M} \exp\left(-\frac{1}{2\sigma^2} |\hat{v}^{(t)}(n) - s_{PIM,m}^{(t)}(n)|^2\right) - N \ln M$$

where $$s_{PIM,m}^{(t)}(n) = \sum_{l=-L_1}^{L_2} h_b \gamma_l s_a^2 (n-l) (s_b^{(t)}(n-l-\tau) = \mu_m)^* \quad (6)$$

$$p_c(s_{PIM,m}^{(t)}(n)) = \frac{1}{M} \quad (7)$$

and $\mu_m$ is the constellation point in the modulation format $\theta$, M is the modulation order of $\theta$.

The final decision of the adopted modulation $\hat{\theta}$ is made by $$\hat{\theta}^{(t)} = \arg \max_\theta L_\theta^{(t)} \quad (8)$$

In the fourth step, the PIM regeneration module 303 is configured to recreate the PIM interference utilizing the parameters and patterns in the third step. Then $\rho_{\hat{\theta},m}^{(t)}(n)$ is defined as the posterior probability of the nth modulated symbol which maps to the mth constellation point in the modulation format $\hat{\theta}$ in the iteration t, $\rho_{\hat{\theta},m}^{(t)}(n)$ and given by $$\rho_{\hat{\theta},m}^{(t)}(n) = \frac{p(v^{(t)}(n) | s_{PIM,m}^{(t)}(n)) p(s_{PIM,m}^{(t)}(n))}{\sum_{m'=1}^{M} p(v^{(t)}(n) | s_{PIM,m}^{(t)}(n)) p(s_{PIM,m}^{(t)}(n))} \quad (9)$$

Then, the determined $\hat{s}_b^{(t)}(n)$ can be expressed as $$\hat{s}_b^{(t)}(n) = \sum_{m=1}^{M} \rho_{\hat{\theta},m}^{(t)}(n) \mu_m \quad (10)$$

The PIM inference $\hat{s}_{PIM,m}^{(t)}$ may be determined and recreated utilizing (10), which can be expressed as $$\hat{s}_{PIM,m}^{(t)}(n) = \sum_{l=-L_1}^{L_2} h_b \gamma_l s_a^2 (n-l) (\hat{s}_b^{(t)}(n-l-\tau) = \mu_m)^* \quad (11)$$

Then, the received baseband signal cancels the PIM interference and performs the signal detection again 302. The updated received signal after PIM cancellation in the iteration t+1 is given by $$x_c^{(t+1)} = x_c^{(t)} - \hat{s}_{PIM,m}^{(t)} \quad (12)$$

To enhance the PIM cancellation and data detection performance, the overall process may be performed in an iterative manner. The overall scheme may be exploited to the single antenna system but may also be extended to a multiple antenna system. Moreover, if the PIM inference is caused by the UL signals which are both unknown at base-station A, i.e., $s_a$ and $s_b$ are both unknown, the proposed PIM cancellation method works in a similar way. In such case, the candidates are expanded to a set from $\theta=1, 2, \ldots, P$ to $\theta=1, 2, P \times K$, where P and K is the number of the possible candidates of $s_a$, and $s_b$. The PIM cancellation process is similar to the case with known $s_a$ and unknown $s_b$.

Figure 4:
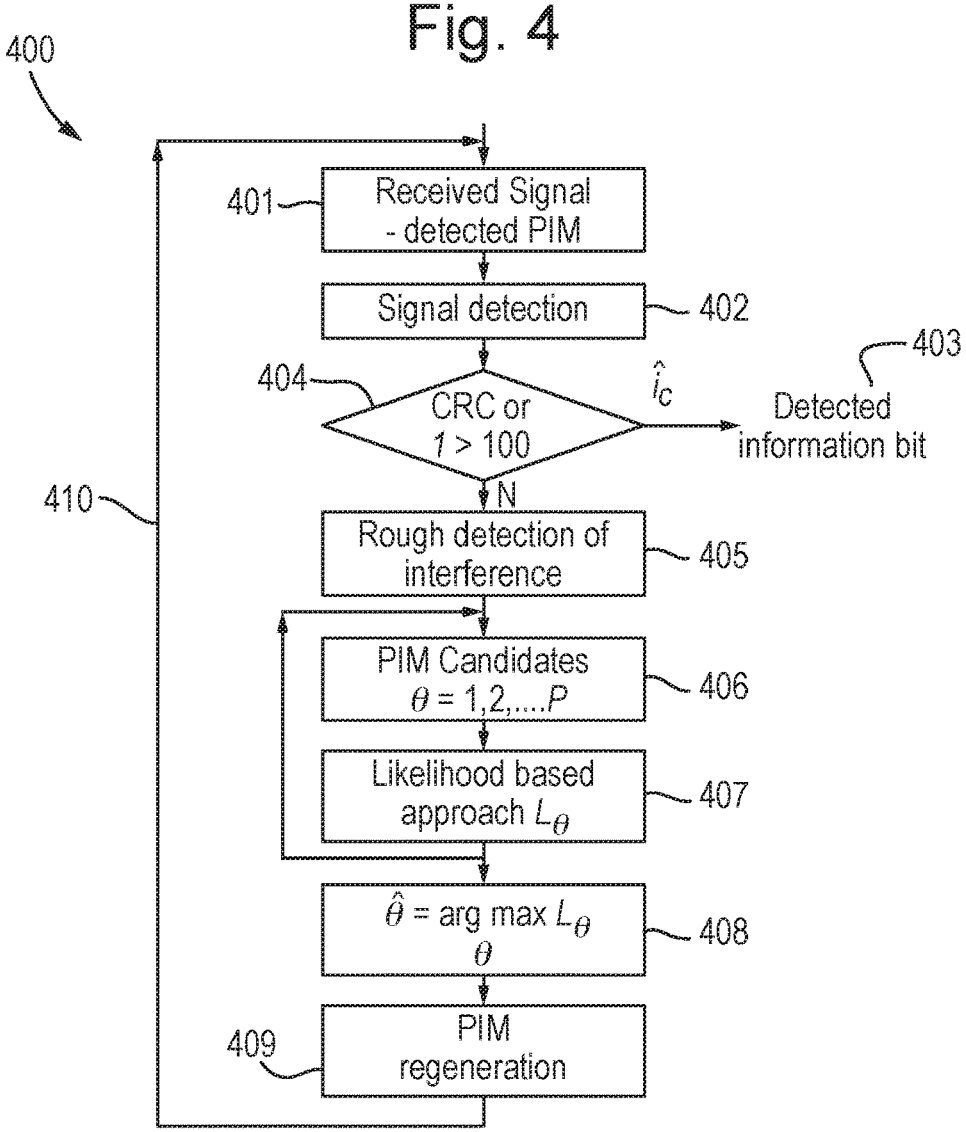
FIG. 4 is another flow chart illustrating the method according to embodiments

An embodiment of the PIM cancellation method is also shown in FIG. 4. In this method 400 the received baseband signal 401 subtracts the detected PIM 402 in a previous iteration 410 which may be re-detected. There is a CRC 404 to verify the correctness of the determined information bits. If CRC is correct in this iteration, it directly output the determined information bits 403. If CRC is incorrectly detected, it utilizes the rough detection 405 of the interference for blind signal identification. Since PIM is caused by the normal DL signal from our own radio combined with the unknown interference signal from other radio vendors or malicious users, it is not possible to determine the exact parameters and patterns of those interference signals (DL signals from other radio vendors for example) directly, such as the carrier frequency, modulation format, channel coding scheme and so forth. However, the base-station can still determine the parameters and patterns which the interference signal may use, in other words, the base-station knows the candidates set 406 of the interference signal $\theta=1,2$, P and predict according to equation (8) 408. Based on the hypothesis testing theory, the likelihood estimates $L_\theta$ 407 are calculated for the P candidates. By utilizing the determined parameters and patterns of the interference signal, it is then possible to recreate 409 the PIM interference and cancel the PIM in the next iteration. The process may be repeated with the above steps until the CRC is correct or until the iteration number exceeds a specific threshold.

Figure 5:
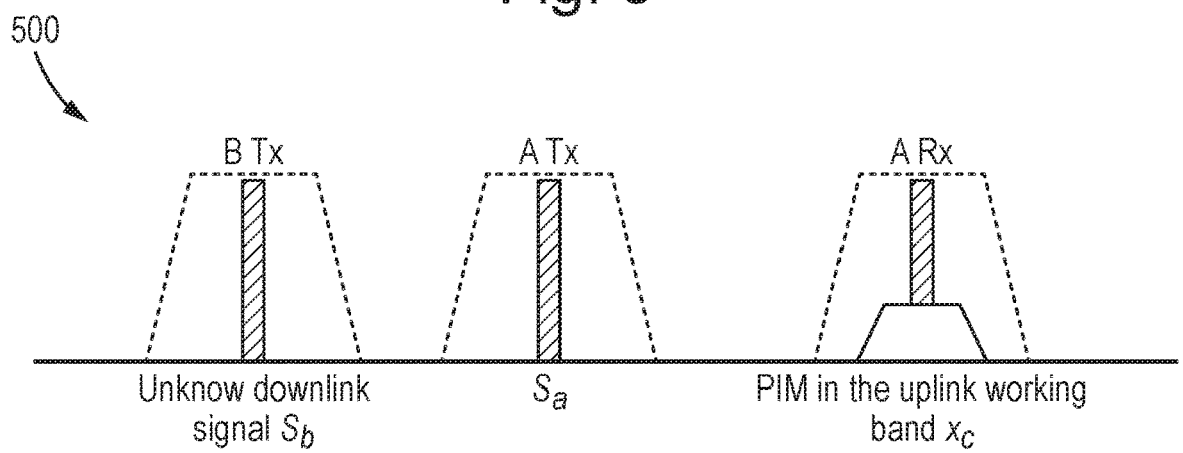
FIG. 5 is illustrating an example of unknown and known downlink signals leading to PIM in the uplink frequency bands.

FIG. 5 describes a simple typical communication scenario 500 that shows some simulation results. This scenario describes a frequency division duplex (FDD) system. In this example a base-station A transmits a known DL signal, $s_a$ and base-station B transmits an unknown DL signal, $s_b$, which when mixed with each other causes PIM as a result of non-desired multiplexing with signal $s_a$. This PIM signal causes disturbance in the uplink working band $x_c$ of the base station A.

Figure 7:
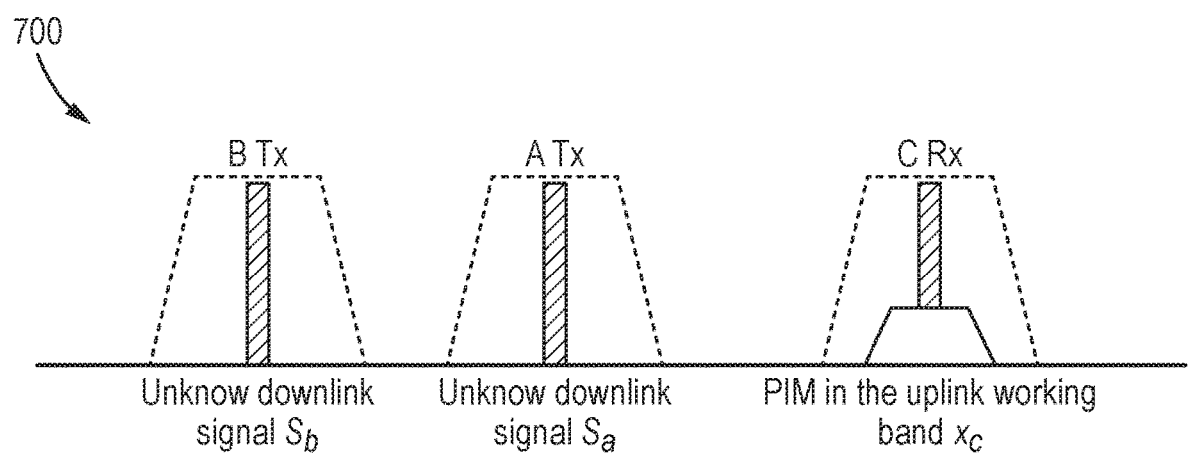
FIG. 7 is illustrating an example of unknown downlink signals leading to PIM in the uplink frequency bands.

FIG. 7 describes a similar typical communication scenario 700 with simulation results in a FDD system. However, in this example it is only unknown DL signals. A base-station A transmits an unknown DL signal, $s_a$ and base-station B transmits an unknown DL signal, $s_b$. These signals are in a downlink communication which when mixed with each other cause the PIM signal. This PIM signal causes disturbance in the uplink working band $x_c$ of the known base station C.

Figure 6A:
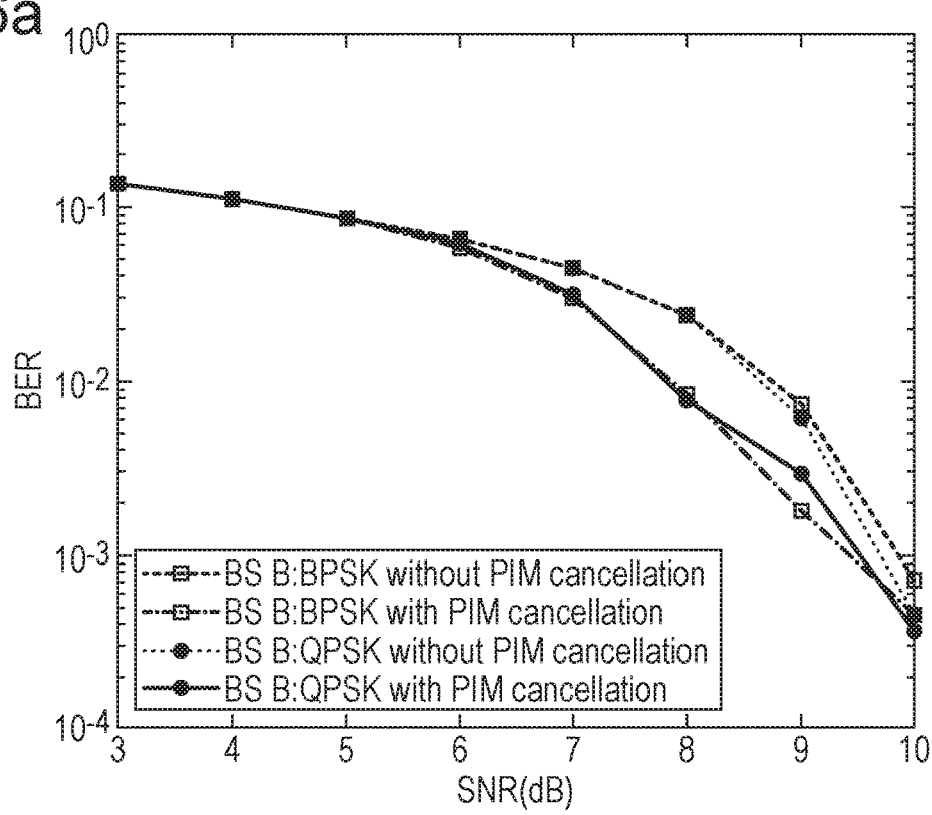
FIGS. 6a and 6b is schematic diagrams illustrating differences between curves using modulation candidates with PIM cancellation and without PIM cancellation.
Figure 6B:
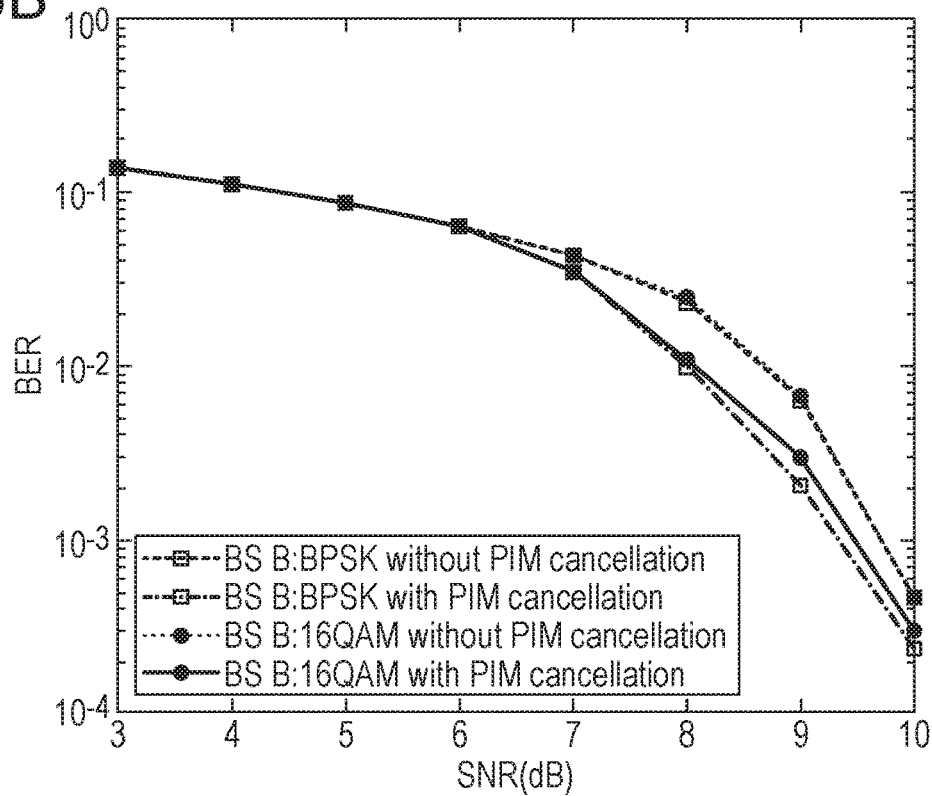

FIGS. 6a and 6b illustrates the effectiveness of the preferred embodiment in a simple communication scenario with the known signal A from base station A and unknown signal B from base station B. In FIGS. 6a and 6b, the power of the transmitted signal $s_a$, $s_b$ and $x_c$ is set to 1. A simple PIM model is considered, which impulse response coefficients, pre-cursor and post-cursor memory taps are set to $\gamma_l=0.3$, and $L_1=L_2=0$. The PIM cancellation performance is evaluated versus signal to noise ratio (SNR) for multiple noise levels. The noise power is calculated by $$\sigma^2 = \frac{1}{10^{SNR/10}}.$$

The adopted modulation format of $x_c$ and $s_a$ at the base-station A is quadrature phase shift keying (QPSK).

In FIG. 6a, the modulation candidates set of the unknown downlink signal $s_b$ is binary phase shift keying, quadrature phase shift keying {BPSK, QPSK}. If the adopted modulation format of $s_b$ is BPSK, the bit error rate (BER) performance after signal detection at base-station A are the curves with a square marker. The dotted curve is the BER performance without using the proposed PIM cancellation scheme, and the solid curves shows the BER performance after PIM cancellation. The BER performance has nearly 1 dB superiority with the PIM cancellation scheme when SNR>7 dB. If the adopted modulation format of $s_b$ is QPSK, the BER performance after signal detection at base-station A are the curves with asterisk marker. Comparing to the BER performance without adopting the proposed scheme, the PIM cancellation method also has nearly 1 dB superiority.

In FIG. 6b, the modulation candidates set of the unknown downlink signal $s_b$ is quadrature phase shift keying, 16 quadrature amplitude modulation {QPSK, 16QAM}. The dotted curve is the BER performance without using the proposed PIM cancellation scheme, and the solid curves shows the BER performance after PIM cancellation. Thus, the simulation results in FIGS. 6a and 6b show that the PIM detection and cancellation scheme is quite effective, and capable to suppress the PIM interference.

In this way the proposed embodiments described herein, successively improves the UL signal quality using an iterative cancellation process. The blind signal identification module can detect the DL signals resulting in PIM without any prior information. The blind signal identification module can handle PIM caused by unknown DL signals from other radio vendors or a mix of these signals with DL signals from our own radio. Then, the iterative cancellation process can further cancel the PIM interference and enhance the data detection performance in an iterative manner. It is especially not known before how to consider the PIM cancellation issue when the prior information of DL signals resulting in PIM are unknown at the base stations, such as the PIM caused by radios from other vendors/operators or even malicious users. This kind of PIM interference problem is very common in practical communication systems, and therefore it is in dire need of an efficient solution. Further, the proposed approach has the advantage of not requiring any extra hardware, such as a wideband receiver which is very expensive, and thus the total added cost will be minimum. Thus, with these embodiments disclosed herein, it solves the PIM detection and cancellation problem, in which the PIM results from unknown DL signals or intermodulation products that arise from own signals and own network node and unknown DL signals from other vendors or just unknown DL signals that arise from other vendors with adjacent network nodes. Some DL signals might not even be part of the same network. The proposed inventive concept is a novel blind identification scheme to detect this PIM interference, which can estimate the parameters, i.e. carrier frequency, identify the patterns including the modulation and channel coding, and detect the information bits of the unknown DL signals resulting in PIM. It is an innovative cancellation process disclosed to cancel the PIM interference, that further successively enhance the data detection performance in an iterative manner.

Figure 8:
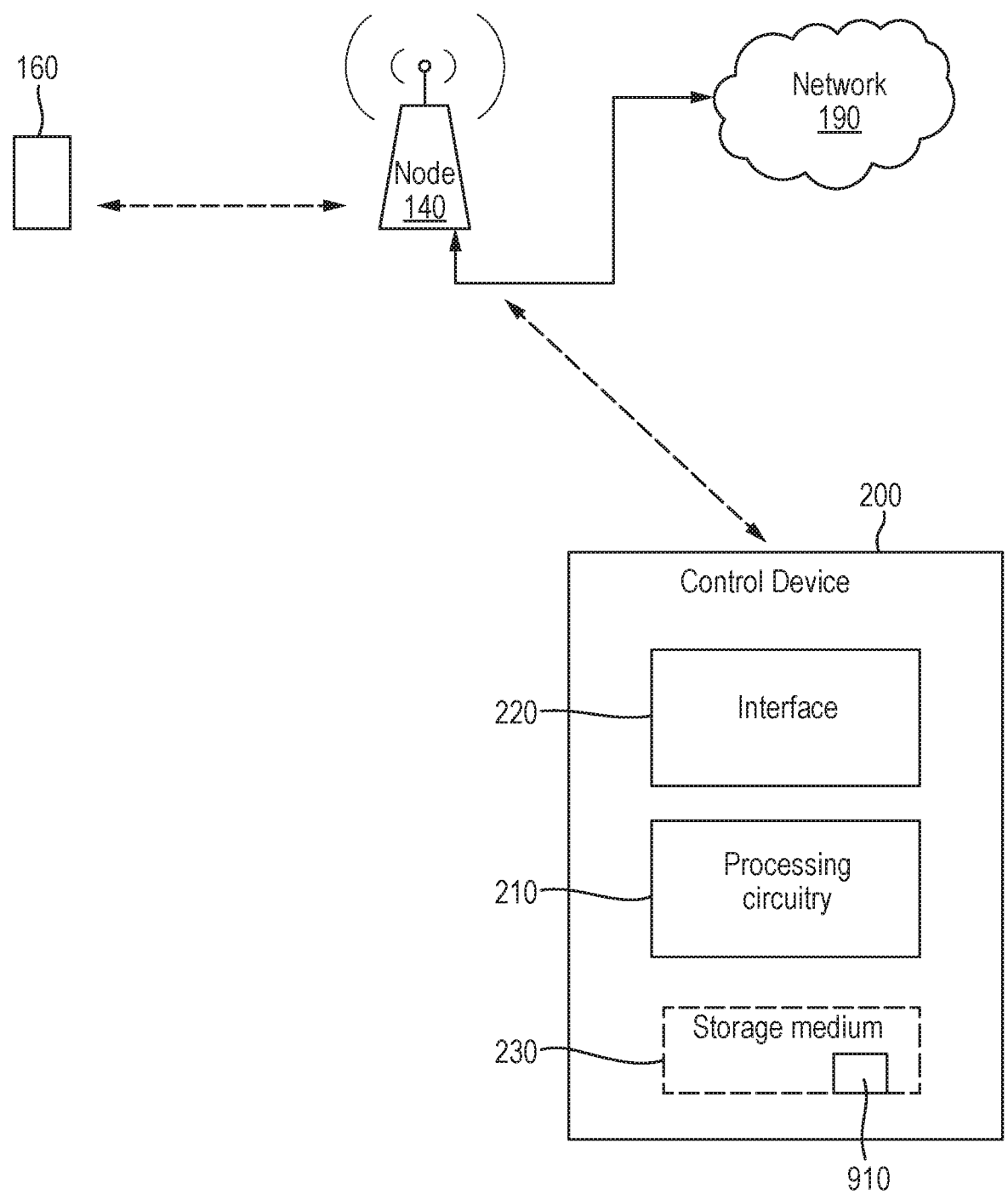
FIG. 8 is a schematic diagram showing a network comprising a network node, a control device and a wireless device according to an embodiment.

FIG. 8 schematically illustrates, in terms of a number of functional units, a wireless network, comprising a network node 140, a wireless device 160 and a control device 200 where they communicate through a network 190. For simplicity, the wireless network of FIG. 8 only depicts network 190, network node 140 and a wireless device 160 and a control device 200 connected to the network node 140. However, in practice, a wireless network may further include any additional elements suitable to support communication between wireless devices or between a wireless device and another communication device, such as a landline telephone, a service provider, or any other network node or end device. Of the illustrated components, network node 140 and control device 200 are depicted with additional detail. The wireless network may provide communication and other types of services to one or more wireless devices to facilitate the wireless devices' access to and/or use of the services provided by, or via, the wireless network. Only a single network is described in the FIG. 10 for simplicity, but it may comprise several networks as for example both a core network, a radio access network and a service network. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA). Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions. Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices of the communications network 190, such as the radio base station 140. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

The control device 200 may be provided as a standalone device or as a part of at least one further device. For example, the control device 200 may be provided in a node of a radio access network or in a node of a core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time. Thus, a first portion of the instructions performed by the control device 200 may be executed in a first device, and a second portion of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 8 the processing circuitry 210 may be distributed among a plurality of devices, or nodes. The same applies to the computer program 920 of FIG. 9.

Figure 9:
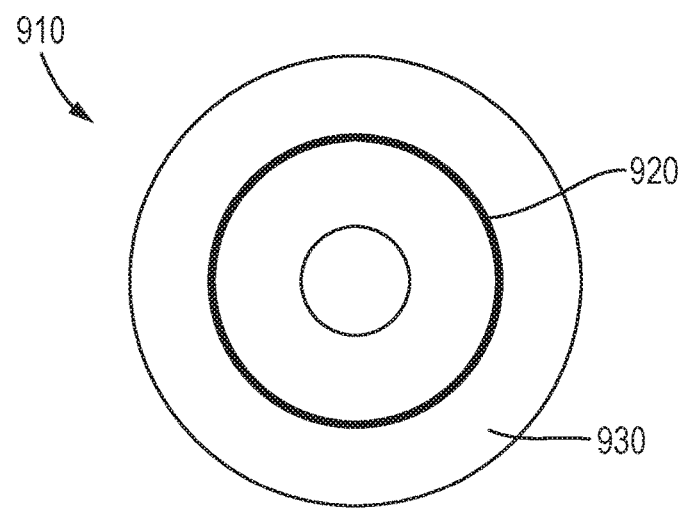
FIG. 9 shows one example of a computer program product comprising computer readable storage medium according to an embodiment.

FIG. 9 shows one example of a computer program product 910 comprising computer readable storage medium 930 (or also called non-transitory computer readable medium). On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In this example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for mitigating passive intermodulation, PIM, in a first network node, wherein said PIM is caused by radio signals transmitted from at least an adjacent network node, the method being performed by a control device, the method comprising the steps:
    i) receiving at least an uplink, UL, radio signal comprising disturbance and desired signals and down-converting the received UL radio signal to a UL baseband signal, wherein the received UL baseband signal comprises detected information bits;
    ii) applying a cyclic redundancy check, CRC, on the detected information bits of the received UL baseband signal, wherein
    iii) in response to determining by the CRC that the UL baseband signal is detected correctly, directly output the detected information bits, and,
    iv) in response to determining by the CRC that the UL baseband signal is incorrectly detected, determining a residual signal of the received UL baseband signal;
    v) applying a blind signal identification scheme on the residual signal of the UL baseband signal to obtain an estimate for a modeled PIM signal; and
    vi) subtracting the estimated modelled PIM signal from the received UL baseband signal as in step i) and updating the received UL baseband signal in an iterative process until CRC is detected correctly or until number of iterations exceeds a predetermined threshold.

2. The method according to claim 1, wherein determining the residual signal comprises: transforming the incorrectly detected information bits of the received UL baseband signal to symbols and subtracting the symbols from the received UL baseband signal.

3. The method according to claim 1, wherein the blind signal identification comprises a maximum likelihood estimation, MLE, of the residual signal.

4. The method according to claim 3, wherein the MLE comprises estimating parameters, patterns and intermodulation products of the PIM from the residual signal of the baseband UL signal to obtain the estimate of the PIM modelled signal.

5. The method according to claim 4, wherein the parameters and patterns of the PIM comprises at least one of: carrier frequency, modulation format, coding patterns, control channel parameters and information bits of the disturbance.

6. The method according to claim 1, wherein the blind signal identification comprises a maximum a posteriori probability (MAP) estimation or machine learning algorithms of the residual signal.

7. The method according to claim 1, wherein the received UL baseband signal is synchronized with radio signals of the first network node before applying the CRC.

8. The method according to claim 1, wherein PIM is caused by known radio signals from the first network node and unknown radio signals from the at least one adjacent network node.

9. The method according to claim 1, wherein PIM is caused by unknown radio signals from the at least one adjacent network nodes.

10. A computer program product comprising a non-transitory computer-readable storage medium storing a computer program comprising instructions which, when executed by a computer, cause the computer to perform the method of claim 1.

11. A control device for mitigating passive intermodulation, PIM, in a first network node, wherein said PIM is caused by radio signals transmitted from at least an adjacent network node, the control device being configured to:
  i) receive at least an uplink, UL, radio signal comprising disturbance and desired signals and down-converting the received UL radio signal to a UL baseband signal, wherein the received UL baseband signal comprises detected information bits;
  ii) apply a cyclic redundancy check, CRC, to the detected information bits of the received UL baseband signal, wherein the control device is configured
  iii) in response to determining by the CRC that the UL baseband signal is detected correctly, directly output the detected information bits, and,
  iv) in response to determining by the CRC that the UL baseband signal is incorrectly detected, determining a residual signal of the received UL baseband signal;
  v) apply a blind signal identification scheme on the residual signal of the UL baseband signal to obtain an estimate for a modeled PIM signal; and
  vi) subtract the estimated modelled PIM signal from the received UL baseband signal as in and updating the received UL baseband signal in an iterative process until CRC is detected correctly or until number of iterations exceeds a predetermined threshold.

12. The control device according to claim 11, wherein determining the residual signal comprises: transforming the incorrectly detected information bits of the received UL baseband signal to symbols and subtracting the symbols from the received UL baseband signal.

13. The control device according to claim 11, wherein the blind signal identification comprises a maximum likelihood estimation, MLE, of the residual signal.

14. The control device according to claim 11, wherein the blind signal identification comprises a maximum a posteriori probability (MAP) estimation or machine learning algorithms of the residual signal.

15. The control device according to claim 13, wherein the MLE comprises estimating parameters, patterns and intermodulation products of the PIM from the residual signal of the baseband UL signal to obtain the estimate of the PIM modelled signal.

16. The control device according to claim 15, wherein the parameters and patterns of the PIM comprises at least one of: carrier frequency, modulation format, coding patterns, control channel parameters and information bits of the disturbance.

17. The control device according to claim 11, wherein the received UL baseband signal is synchronized with radio signals of the first network node before applying the CRC.

18. The control device according to claim 11, wherein PIM is caused by known radio signals from the first network node and unknown signals from the at least one adjacent network node.

19. The control device according to claim 11, wherein PIM is caused by unknown radio signals from the at least one adjacent network node.

20. A control device for mitigating passive intermodulation, PIM, in a first network node, wherein said PIM is caused by radio signals transmitted from at least an adjacent network node, the control device comprising processing circuitry, the processing circuitry being configured to cause the control device to:
  i) receive at least an uplink, UL, radio signal comprising disturbance and desired signals and down-converting the received UL radio signal to a UL baseband signal, wherein the received UL signal comprises detected information bits;
  ii) apply a cyclic redundancy check, CRC, to the detected information bits of the received UL baseband signal, wherein the control device is configured
  iii) in response to determining by the CRC that the UL baseband signal is detected correctly, directly output the detected information bits, and,
  iv) in response to determining by the CRC that the UL baseband signal is incorrectly detected, determining a residual signal of the received UL baseband signal;
  v) apply a blind signal identification scheme on the residual signal of the UL baseband signal to obtain an estimate for a modeled PIM signal; and
  vi) subtract the estimated modelled PIM signal from the received UL baseband signal as in and updating the received UL baseband signal in an iterative process until CRC is detected correctly or until number of iterations exceeds a predetermined threshold.

* * * * *